(12) United States Patent
Itotani et al.

(10) Patent No.: US 10,223,562 B2
(45) Date of Patent: Mar. 5, 2019

(54) ELECTRONIC DEVICE (71) Applicant: Panasonic Intellectual Property Management Co., Ltd., Osaka (JP)

(72) Inventors: Takehiro Itotani, Osaka (JP); Yukio Fujita, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/008,222

(22) Filed: Jun. 14, 2018

(65) Prior Publication Data
US 2018/0293416 A1 Oct. 11, 2018

Related U.S. Application Data (63) Continuation of application No. PCT/JP2016/005155, filed on Dec. 16, 2016.

(30) Foreign Application Priority Data

Jan. 21, 2016 (JP) ................ 2016-009962

(51) Int. Cl.
*G06K 7/10* (2006.01)
*G02B 5/00* (2006.01)
*G06K 19/06* (2006.01)

(52) U.S. Cl.
CPC ........... *G06K 7/10732* (2013.01); *G02B 5/00* (2013.01); *G06K 7/10564* (2013.01); *G06K 7/10722* (2013.01); *G06K 7/10821* (2013.01); *G06K 19/06028* (2013.01)

(58) Field of Classification Search
None
See application file for complete search history.

(56) References Cited

U.S. PATENT DOCUMENTS

| 6,039,256 A | 3/2000 | Konosu et al. | |
| 2007/0228306 A1* | 10/2007 | Gannon | G06K 7/10722 250/555 |
| 2014/0224874 A1* | 8/2014 | Shiraishi | G06K 7/10732 235/383 |

FOREIGN PATENT DOCUMENTS

| JP | 11-195082 | 7/1999 |
| JP | 2014-154037 | 8/2014 |

OTHER PUBLICATIONS

International Search Report of PCT application No. PCT/JP2016/005155 dated Jan. 17, 2017.

* cited by examiner

*Primary Examiner* — Kristy A Haupt
(74) *Attorney, Agent, or Firm* — Renner Otto Boisselle & Sklar, LLP (57) ABSTRACT An electronic device includes a housing main body having an opening, a transparent plate attached to an outer face of the housing main body so as to cover the opening, a light-emitting diode (LED) that is disposed in the housing main body to face outside via the opening and that illuminates a bar-code with illumination light, and an imaging unit that is disposed in the housing main body to face outside via the opening and that detects reflected light reflected on the bar-code in the illumination light. The housing main body is integrally formed with a shade configured to shade reflected light reflected on the transparent plate in the illumination light illuminated from the LED such that the illumination light does not enter into the imaging unit.

4 Claims, 7 Drawing Sheets

ELECTRONIC DEVICE

BACKGROUND

1. Technical Field

The present disclosure relates to a bar-code readable electronic device.

2. Description of Related Art

Unexamined Japanese Patent Publication No. 1999-195082 discloses a bar-code readable optical information reader. The optical information reader according to Unexamined Japanese Patent Publication No. 1999-195082 includes an illumination area restriction member for preventing reflected light reflected on a dust-proof plate in illumination light illuminated from a light-emitting diode (transparent plate) from entering into an optical module.

SUMMARY

An electronic device according to the present disclosure includes a housing having an opening, a transparent plate attached to an outer face of the housing so as to cover the opening, a light source that is disposed in the housing to face outside via the opening and that illuminates a bar-code with illumination light, and a photo detector that is disposed in the housing to face outside via the opening and that detects reflected light reflected on the bar-code in the illumination light.

The housing is integrally formed with a shade configured to shade reflected light reflected on the transparent plate in the illumination light illuminated from the light source such that the reflected light does not enter into the photo detector.

According to the present disclosure, the shade integrally formed with the housing shades the reflected light reflected on the transparent plate in the illumination light illuminated from the light source such that the reflected light does not enter into the photo detector. No other member served as a shade is therefore required. While solving problems including laborious installation and misaligned positions, the reflected light reflected on the transparent plate in the illumination light illuminated from the light source can be less likely to enter into the photo detector.

DETAILED DESCRIPTION

Hereinafter, exemplary embodiments will be described in detail with reference to the drawings as appropriate. Note, however, that unnecessarily detailed descriptions will sometimes be omitted. For example, in some cases, detailed description of already well-known items and repeated description with respect to substantially the same configuration will be omitted. These omissions are made to avoid unnecessary redundancy of the following description and to facilitate the understanding of those skilled in the art.

Note that the inventor of the present disclosure provides the accompanying drawings and the following description in order to allow those skilled in the art to fully understand the present disclosure, and do not intend to limit the subject matter as described in the appended claims.

First Exemplary Embodiment

A first exemplary embodiment will be described below with reference to the drawings.

1. Configuration 1-1. Outline of Electronic Device

Figure 1:
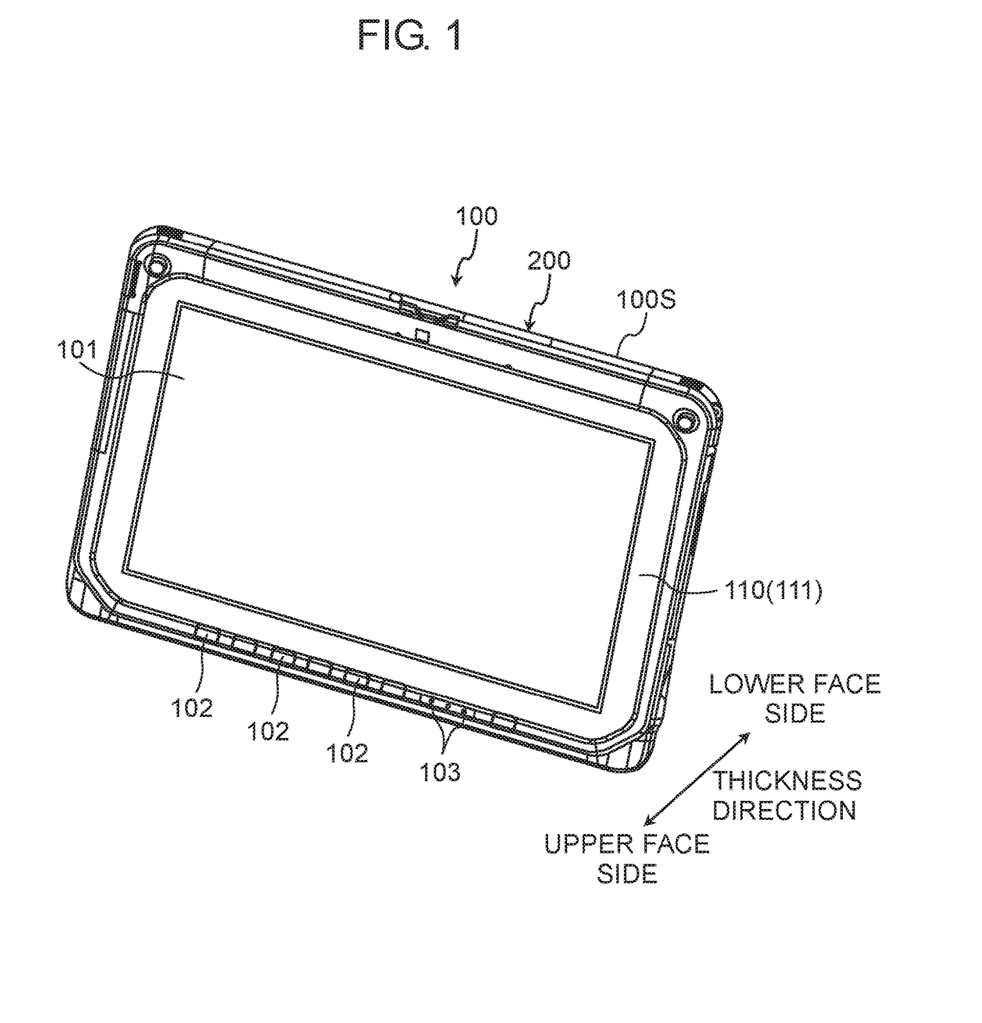
FIG. 1 is a perspective view of an upper face (front face) of an electronic device according to an exemplary embodiment of the present disclosure.

FIG. 1 is a perspective view of an upper face (front face) of an electronic device according to the present exemplary embodiment. In FIG. 1, for purpose of convenience, a side of electronic device 100 in a thickness direction refers to an "upper face side," and another side refers to a "lower face side." The same will apply to FIGS. 3, 4, and 6 to 8. As shown in FIG. 1, electronic device 100 is a tablet computer. Electronic device 100 has, on its upper face, display 101, operation switches 102, and indicators 103. Display 101 is, for example, a liquid crystal display panel. Display 101 is also a touch panel capable of accepting a touch operation performed by a user. Operation switches 102 are hardware switches each capable of accepting a depression operation performed by the user. Indicators 103 are display devices each capable of displaying an operating state or the like of electronic device 100. Indicators 103 are each composed of a light-emitting diode (LED), for example. Electronic device 100 is incorporated with a processing unit such as a central processing unit (CPU), storage devices (recording devices) such as a random access memory (RAM), a read only memory (ROM), and a solid state disk (SSD), a battery, and other components. The ROM and the SSD stores, for example, an operating system (OS), various application programs, and various data. The CPU reads the OS, the application programs, and the various data, and executes arithmetic processing to achieve various functions according to a content of an operation performed by the user, for example.

Figure 2:
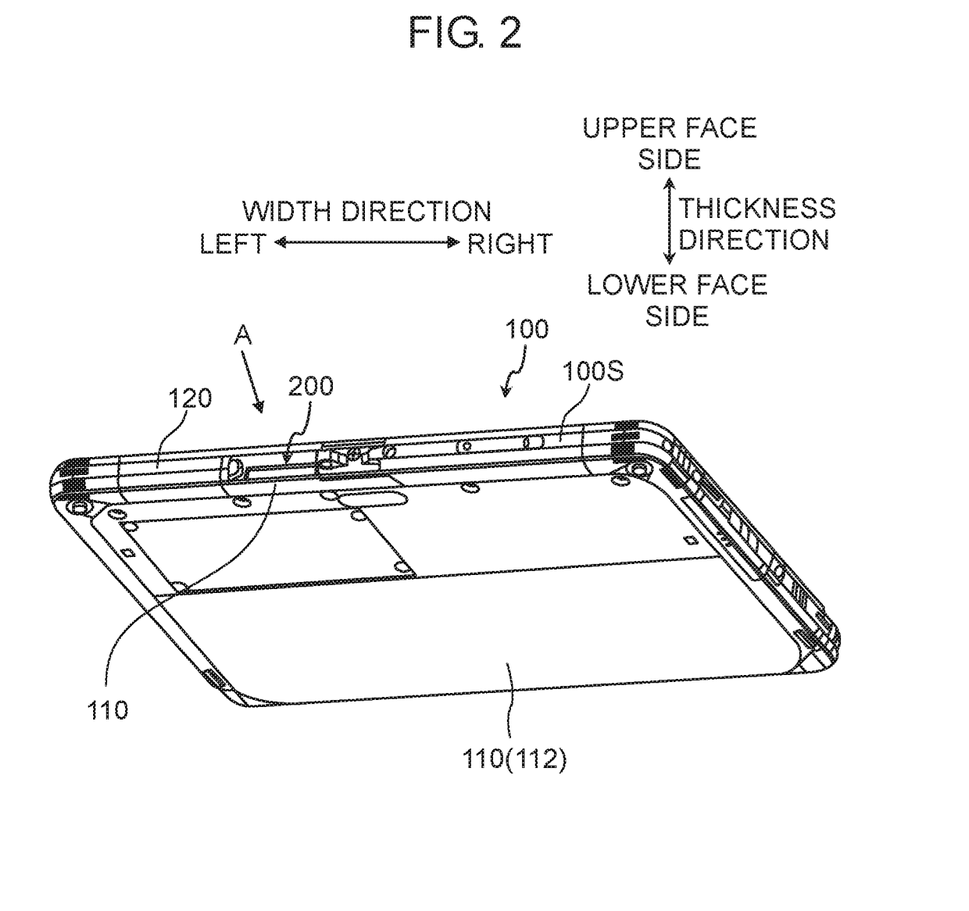
FIG. 2 is a perspective view of a lower face (rear face) of the electronic device according to the present exemplary embodiment.

FIG. 2 is a perspective view of a lower face (rear face) of electronic device 100 according to the present exemplary embodiment. Electronic device 100 accommodates, in its side 100S, bar-code reader module 200. A configuration and a disposition structure of bar-code reader module 200 will now be described herein. In FIG. 2, for purpose of convenience, a side of electronic device 100 in a width direction refers to "left," and another side refers to "right," based on side 100S. The same will apply to FIGS. 3, 4, and 6 to 8.

1-2. Configuration of Bar-Code Reader Module

Figure 3:
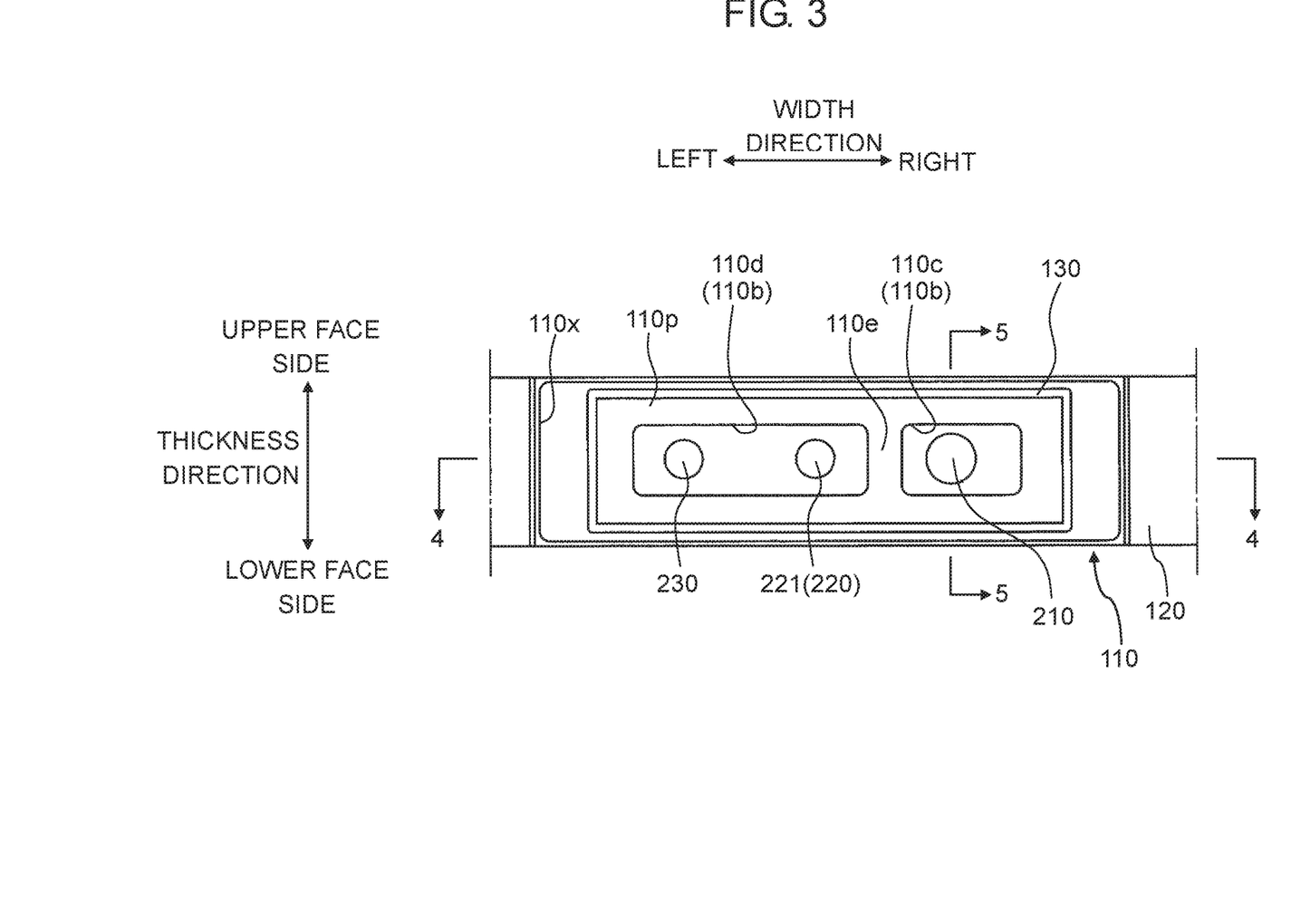
FIG. 3 is a view as viewed from a direction of arrow A in FIG. 2.
Figure 4:
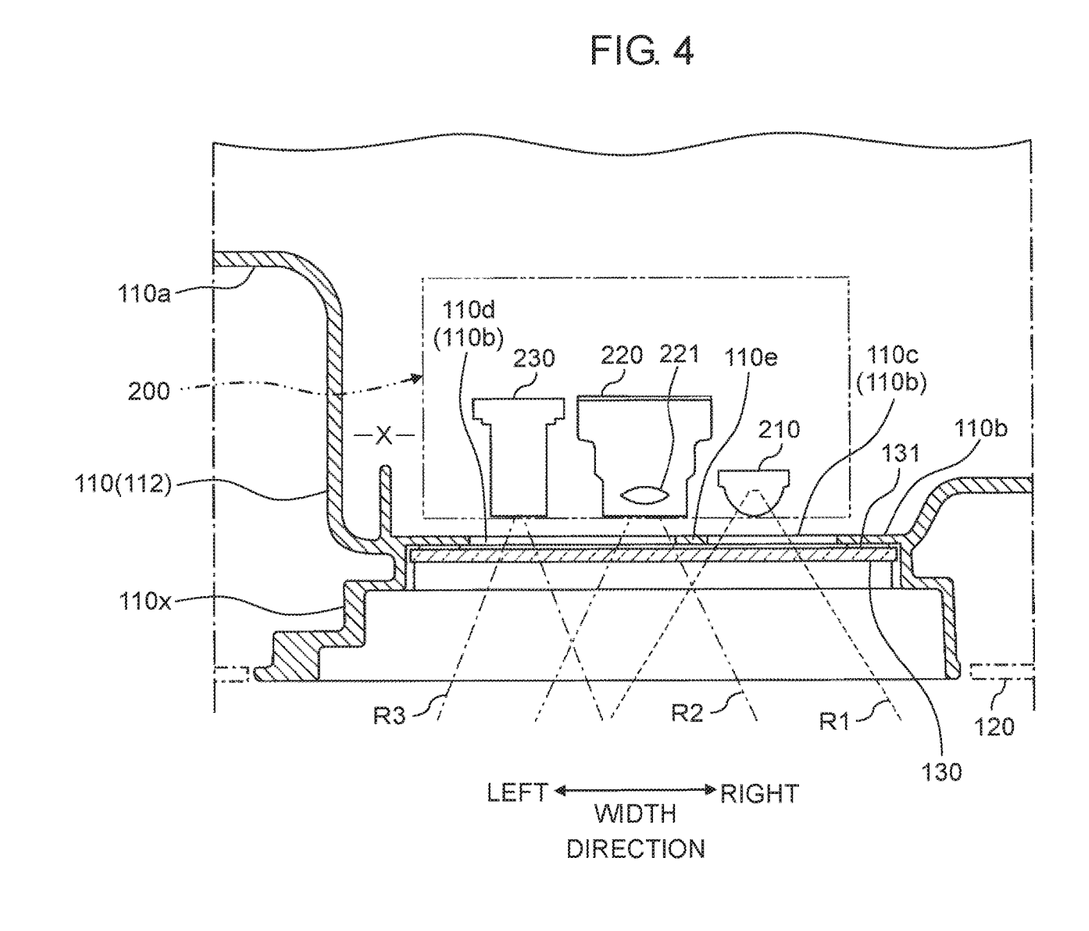
FIG. 4 is a cross-sectional view taken along line 4-4 illustrated in FIG. 3.

FIG. 3 is a view as viewed from a direction of arrow A in FIG. 2. FIG. 4 is a cross-sectional view taken along line 4-4 illustrated in FIG. 3.

Bar-code reader module 200 is light-emitting diode 210 (hereinafter referred to as "LED 210"), imaging unit 220, laser element 230, and a controller.

LED 210 outputs illumination light for illuminating a bar-code to be read. LED 210 is a high brightness LED such as a white LED. LED 210 is provided only one. FIG. 4 shows R1 indicative of an illumination area (illuminating angle) of LED 210 in the width direction of electronic device 100. Illumination area R1 refers to an area (illuminating angle) within which an intensity of illumination light illuminated from LED 210 is equal to or above a predetermined light intensity.

Imaging unit 220 detects reflected light in which the illumination light illuminated from LED 210 is reflected on a bar-code. Imaging unit 220 includes optical system 221 including an optical lens and other components, an imaging element such as a charge coupled device (CCD), a controller, and other components, generates imaging data corresponding to an object image formed, via optical system 221, on an imaging face of the imaging element, and outputs the generated imaging data to a central processing unit of electronic device 100. FIG. 4 shows R2 indicative of an imaging area (angle of view) of imaging unit 220 in the width direction of electronic device 100.

When bar-code reader module 200 reads a bar-code (captures the bar-code with imaging unit 220), laser element 230 outputs a beam indicating a positional area in which the bar-code to be read should be disposed. FIG. 4 shows R3 indicative of an illumination area (angle of view) of laser element 230 in the width direction of electronic device 100. The illumination area of laser element 230 is determined by a scan area of a beam to be output from laser element 230.

Bar-code reader module 200 outputs the imaging data generated by imaging unit 220 to a decode board. The decode board decodes the imaging data, and outputs a decode signal indicative of bar-code information. The central processing unit of electronic device 100 accepts the decode signal from the decode board to perform various processing based on the bar-code information represented by the decode signal. Electronic device 100 thus functions as a bar-code reader. Instead of the above-described decode board, the imaging data may be decoded by a controller for decoding, which may be included in electronic device 100, or a controller that may be included in bar-code reader module 200.

1-3. Disposition Structure of Bar-Code Reader Module

The housing in which bar-code reader module 200 is disposed will now first be described herein. The housing includes, as shown in FIGS. 1, 2, housing main body 110, side cover 120 covering four sides of housing main body 110, and the like. Housing main body 110 includes upper housing main body 111 on the upper face side of electronic device 100 onto which display 101 is disposed, for example, lower housing main body 112 on the lower face side of electronic device 100, and other components. Members of housing main body 110 are each made of a metal such as a magnesium alloy for improved robustness of the electronic device. Side cover 120 is made of a resin so as to be capable of absorbing shocks applied externally to the sides of electronic device 100. A description will appropriately be given below based on housing main body 110 combined with upper housing main body 111 and lower housing main body 112, unless upper housing main body 111 and lower housing main body 112 should be described separately.

Figure 5:
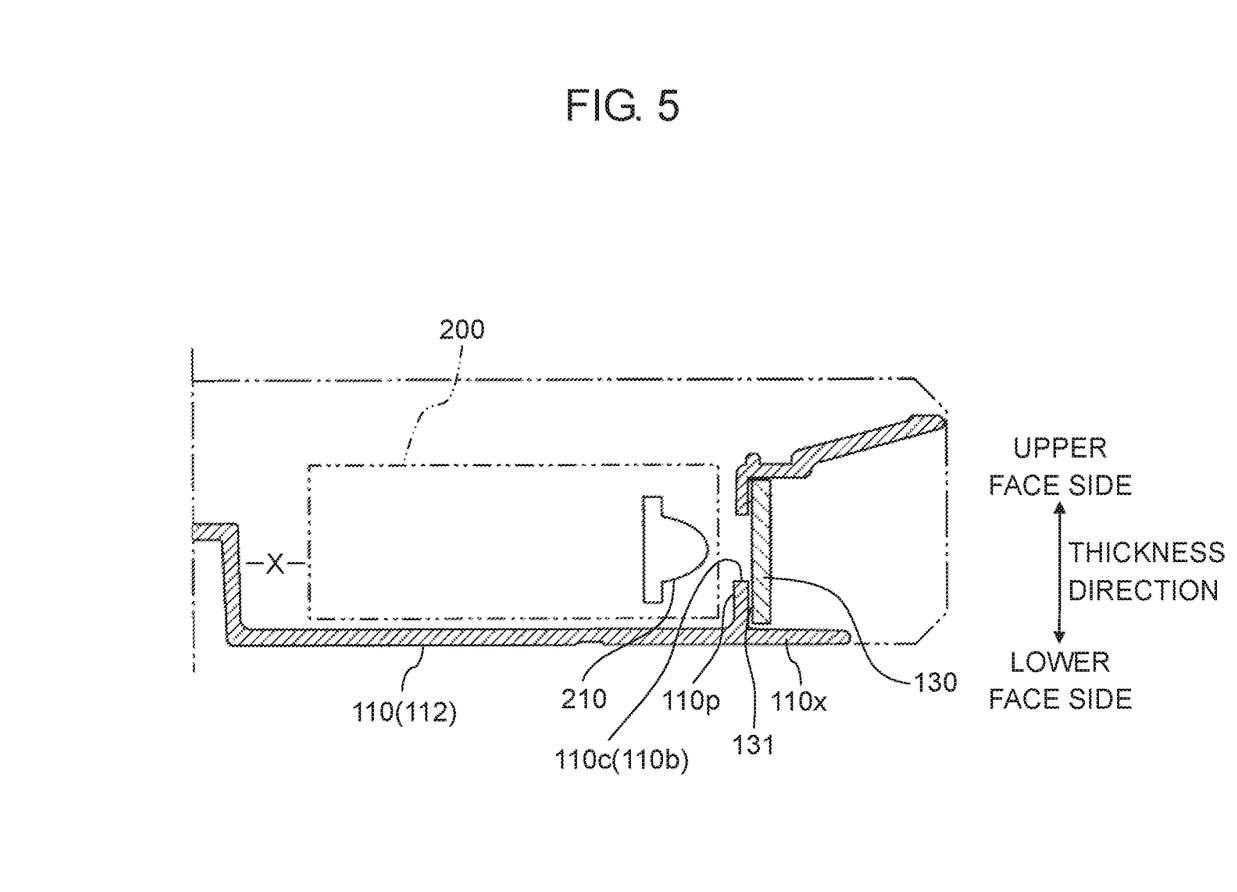
FIG. 5 is a cross-sectional view taken along line 5-5 illustrated in FIG. 3.

Next, with reference to FIG. 5, in addition to FIGS. 3, 4, a disposition structure of bar-code reader module 200 will now be described herein. FIG. 5 is a cross-sectional view taken along line 5-5 illustrated in FIG. 3. As shown in FIGS. 3, 4, and 5, bar-code reader module 200 is accommodated in housing main body 110 of electronic device 100. Specifically, bar-code reader module 200 is disposed in accommodation portion X formed by externally expanding side wall 110a of housing main body 110 (lower housing main body 112) of electronic device 100. On side wall 110a, opening 110b is formed on portion 110p (hereinafter referred to as "predetermined side wall 110p") facing LED 210, imaging unit 220, and laser element 230 of bar-code reader module 200. Opening 110b includes two openings, i.e., first opening 110c and second opening 110d. First opening 110c causes LED 210 to face outside, and second opening 110d causes imaging unit 220 and laser element 230 to face outside from housing main body 110. First opening 110c and second opening 110d are each formed in an approximately rectangular shape.

Transparent plate 130 is attached to an outer face of predetermined side wall 110p. Transparent plate 130 is a member for preventing dust and dirt from entering into electronic device 100 via first opening 110c and second opening 110d, and is fixed on the outer face of predetermined side wall 110p with adhesive 131 so as to cover first opening 110c and second opening 110d. Transparent plate 130 may be fixed to the outer face of predetermined side wall 110p with double sided tape.

Transparent plate 130 is made of a transparent resin or glass, for example, and allows illumination light illuminated from LED 210, reflected light reflected on a bar-code, and a laser beam output from laser element 230 to pass through.

Lower housing main body 112 is formed with projection frame 110x formed in a cylindrical shape and projecting outward from around transparent plate 130. Projection frame 110x prevents external light unnecessary for imaging unit 220 from entering.

Predetermined side wall 110p is formed with shade 110e. Shade 110e is formed by a wall separating opening 110b into first opening 110c and second opening 110d in a direction toward which LED 210 (light source) and imaging unit 220 (photo detector) are disposed. Shade 110e has a shape extending in the thickness direction of electronic device 100.

A position and a shape of shade 110e are determined so as to satisfy four conditions shown below.

(1) Reflected light reflected on transparent plate 130 in illumination light illuminated from LED 210 within illumination area R1 does not enter into optical system 221 of imaging unit 220. The reflected light reflected on transparent plate 130 includes both of reflected light reflected on a device inner face of transparent plate 130 (a face into which illumination light enters) and reflected light reflected on a device outer face of transparent plate 130 (a face from which illumination light emits).

(2) Shade 110e lies outside of illumination area R1 (illuminating angle) of LED 210.

(3) Shade 110e lies outside of imaging area R2 (angle of view) of imaging unit 220.

(4) Reflected light reflected on a device inner face of shade 110e in illumination light illuminated from LED 210 within illumination area R1 does not enter into optical system 221 of imaging unit 220.

The position and the shape satisfying the above-described four conditions may be obtained geometrically based on positional relationships among LED 210, imaging unit 220, and transparent plate 130 (e.g., distances from LED 210 and imaging unit 220 to transparent plate 130, distances from LED 210 and imaging unit 220 to shade 110e, and a distance from LED 210 to imaging unit 220), illumination area R1

(illuminating angle) of LED 210, imaging area R2 (angle of view) of imaging unit 220, and other factors.

The condition described in (4) may not be satisfied, provided that an anti-reflection coating is implemented on the device inside face of shade 110e, or other similar measures are taken. For laser element 230, light reflected toward imaging unit 220 is not taken into account because laser element 230 illuminates a laser beam having precise directivity, and thus, even when the laser beam reflects on transparent plate 130, the light reflected toward imaging unit 220 will be negligible.

Figure 6:
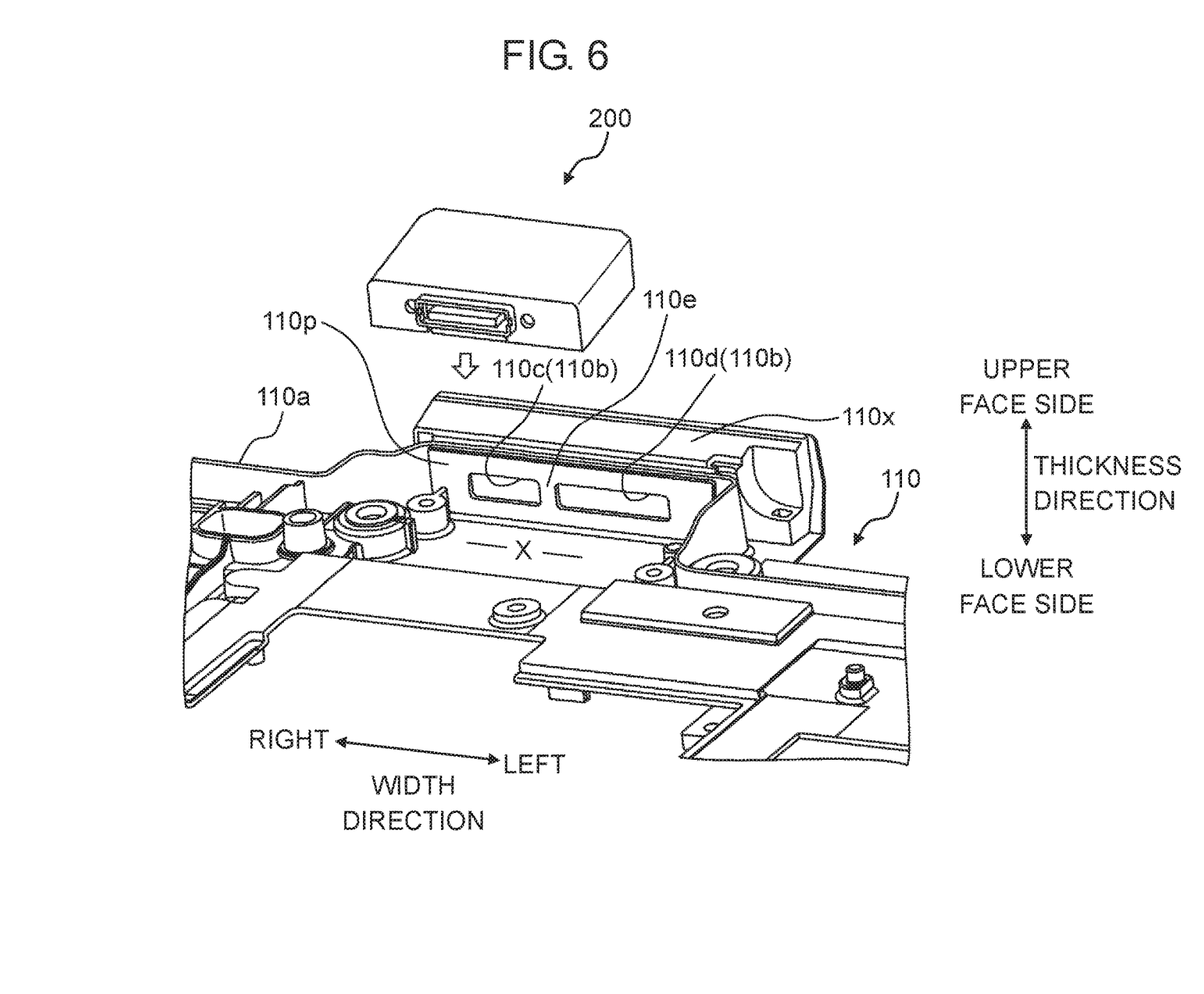
FIG. 6 is a perspective view of an accommodation portion for a bar-code reader module, which lies on a lower housing main body.

FIG. 6 is a perspective view of accommodation portion X for bar-code reader module 200, which lies on lower housing main body 112. As shown in FIG. 6 and above-described FIG. 4, shade 110e is integrally formed with upper housing main body 111 configuring housing main body 110.

1-4. Action

An action of the present exemplary embodiment will now be described herein. Issues present in the present disclosure will now first be described herein. Thinner electronic device 100 has been demanded in recent years for further convenience to users, for example. Even in electronic device 100 according to the present exemplary embodiment, various configurations have been adopted to achieve a thinner structure. A portion of electronic device 100, onto which bar-code reader module 200 is disposed, has been reduced in thickness as much as possible, by taking into account a thickness of bar-code reader module 200.

As a result of the thinner structure, as shown in FIG. 5, transparent plate 130 is applied with adhesive 131 on an area served as a margin around opening 110c (110b) on the outer face of predetermined side wall 110p. In other words, predetermined side wall 110p should have a margin for applying transparent plate 130, and thus the margin limits a height of opening 110c (110b) (a length in the thickness direction of electronic device 100).

A height of bar-code reader module 200 (a length in the thickness direction of electronic device 100) is greater than the height of opening 110c (110b). Even when bar-code reader module 200 is disposed at a position closer as much as possible to predetermined side wall 110p, bar-code reader module 200 and transparent plate 130 are separated away by at least a thickness of predetermined side wall 110p of lower housing main body 112.

Figure 7:
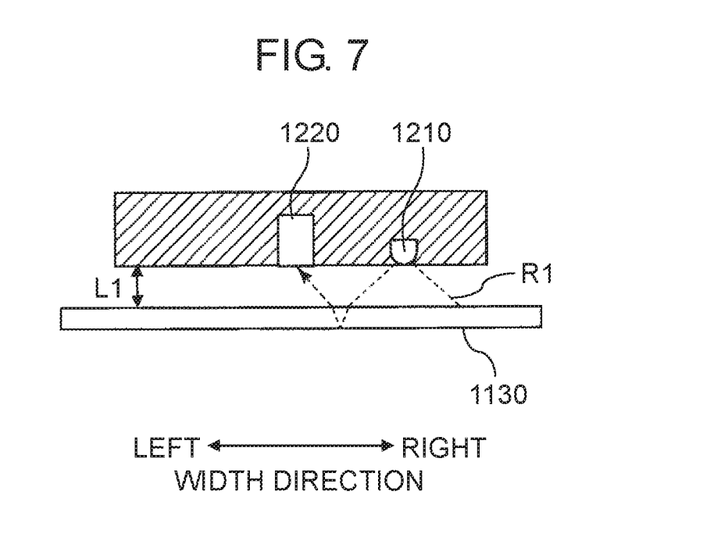
FIG. 7 is a view for describing a comparative example.

If distance L1 is present, as shown in a comparative example of FIG. 7, for example, illumination light illuminated from LED 1210 would reflect on transparent plate 1130, and the reflected light would enter into imaging unit 1220 together with reflected light reflected on a bar-code. As a result, the reflected light reflected on transparent plate 1130 would act as noise, and thus bar-code information would not appropriately be decoded from imaging data in imaging unit 1220. If bar-code reader module 200 (LED 1210 and imaging unit 1220) and transparent plate 1130 are disposed further closer, the reflected light reflected on transparent plate 1130 can be prevented from entering. However, as described above, reducing distance L1 described above is not possible.

Figure 8:
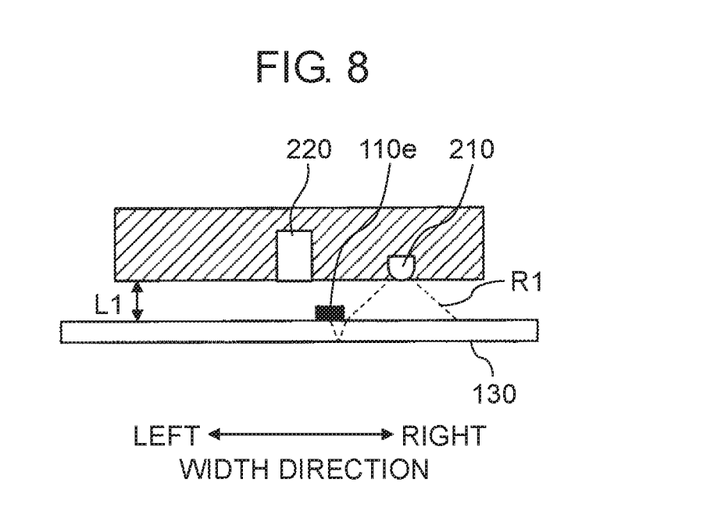
FIG. 8 is a view for describing effects and issues of the present exemplary embodiment.

The present exemplary embodiment has been configured, as shown in FIG. 8, to provide shade 110e on a path through which the light reflected on transparent plate 130 in the illumination light illuminated from LED 210 to reach imaging unit 220, such that the reflected light reflected on transparent plate 130 is blocked by shade 110e and does not enter into imaging unit 220. Therefore, the bar-code information can appropriately be decoded from imaging data in imaging unit 1220.

In the present exemplary embodiment, shade 110e is integrally formed with the housing. This configuration prevents problems from arising, such as laborious installation of another member for shading, and misaligned position of the other member.

2. Effects and Other Benefits

Electronic device 100 according to the present exemplary embodiment includes housing main body 110 (housing) having opening 110b, transparent plate 130 attached to an outer face of housing main body 110 (housing) so as to cover opening 110b, LED 210 (light source) that is disposed in housing main body 110 (housing) to face outside via opening 110b and that illuminates a bar-code with illumination light, and imaging unit 220 (photo detector) that is disposed in housing main body 110 (housing) to face outside via opening 110b and that detects reflected light reflected on the bar-code in the illumination light.

Housing main body 110 (housing) is integrally formed with shade 110e configured to shade the reflected light reflected on transparent plate 130 in the illumination light illuminated from LED 210 (light source) such that the reflected light does not enter into imaging unit 220 (photo detector).

According to this configuration, shade 110e integrally formed with housing main body 110 (housing) shades the reflected light reflected on transparent plate 130 in the illumination light illuminated from LED 210 (light source) such that the reflected light does not enter into imaging unit 220 (photo detector). Another member may not therefore be provided for shading, and, while solving problems including laborious installation and misaligned positions, the reflected light reflected on transparent plate 130 in the illumination light illuminated from LED 210 (light source) can be less likely to enter into imaging unit 220 (photo detector).

In the present exemplary embodiment, opening 110b is formed on predetermined side wall 110p (predetermined side wall) of housing main body 110 (housing).

Shade 110e is formed by a wall that is a part of predetermined side wall 110p (predetermined side wall), and that separates opening 110b into two openings, i.e., first opening 110c (first opening) and second opening 110d (second opening), in a direction toward which LED 210 (light source) and imaging unit 220 (photo detector) are disposed.

Shade 110e can thus be formed from a simple structure.

In this exemplary embodiment, shade 110e is formed outside of illumination area R1 within which LED 210 (light source) illuminates illumination light.

Even when shade 110e is provided, illumination light illuminated from LED 210 (light source) within illumination area R1 will not be shaded. LED 210 (light source) can thus appropriately illuminate illumination light within illumination area R1 toward a bar-code.

In the present exemplary embodiment, shade 110e is formed outside of imaging area R2 (detection area) of imaging unit 220.

Even when shade 110e is provided, imaging area R2 of imaging unit 220 will not be narrowed.

In the present exemplary embodiment, LED 210 (light source) is provided only one.

Smaller, thinner electronic device 100 can thus be achieved. Shade 110e may be provided only one, for example.

Other Exemplary Embodiments

The first exemplary embodiment has been described above and exemplified as the technique of the present disclosure. However, the technique of the present disclosure is not limited to the above described first exemplary embodiment, but is applicable to another exemplary embodiment where an amendment, a replacement, an addition, or an omission has been made appropriately.

Another exemplary embodiment will now be described herein.

In the first exemplary embodiment, only one light-emitting diode 210 (light source) and only one shade 110*e* are provided. In the present disclosure, a light source and a shade may respectively be provided in plural numbers.

The first exemplary embodiment has been described with an example where the electronic device according to the present disclosure is applied to a tablet computer. However, it is obvious that the electronic device according to the present disclosure is also applicable to bar-code readers for mainly reading bar-codes. The electronic device according to the present disclosure is widely applicable to bar-code readable electronic devices.

The exemplary embodiments have been described above and exemplified as the technique of the present disclosure. The accompanying drawings and detailed description have been provided for this purpose.

Accordingly, the components described in the appended drawings and the detailed description include not only components essential for solving the above problems, but may also include components that are not essential for solving the above problems so as to exemplify the above-mentioned technique. Therefore, it should not be immediately construed that these components that are not essential are essential even if the components are described in the accompanying drawings and the detailed description.

Since the above-described exemplary embodiments are for exemplifying the technique of the present disclosure, various modifications, replacements, additions, and omissions can be made within the scope of the appended claims or of their equivalents.

The present disclosure is widely usable in electronic devices configured to be bar-code readable.

What is claimed is:

1. An electronic device comprising:
a housing having an opening;
a transparent plate attached to an outer face of the housing so as to cover the opening;
a light source disposed in the housing to face outside via the opening, the light source emitting illumination light to illuminate a bar-code; and
a photo detector disposed in the housing to face outside via the opening, the photo detector detecting reflected light reflected on the bar-code in the illumination light,
wherein the housing is integrally formed with a shade configured to shade reflected light reflected on the transparent plate in the illumination light illuminated from the light source such that the reflected light reflected on the transparent plate does not enter into the photo detector,
the opening is formed on a predetermined side wall of the housing, and
the shade is formed by a wall that is a part of the predetermined side wall, and that separates the opening into two openings that are arranged in a direction toward which the light source and the photo detector are disposed.

2. The electronic device according to claim 1, wherein the shade is formed outside of a predetermined illumination area of the light source.

3. The electronic device according to claim 1, wherein the shade is formed outside of a detection area of the photo detector.

4. The electronic device according to claim 1, wherein the light source is provided only one.

* * * * *